May 12, 1925.  1,537,619
W. H. PUCKETT
FISHING TOOL
Filed March 5, 1924   5 Sheets-Sheet 1
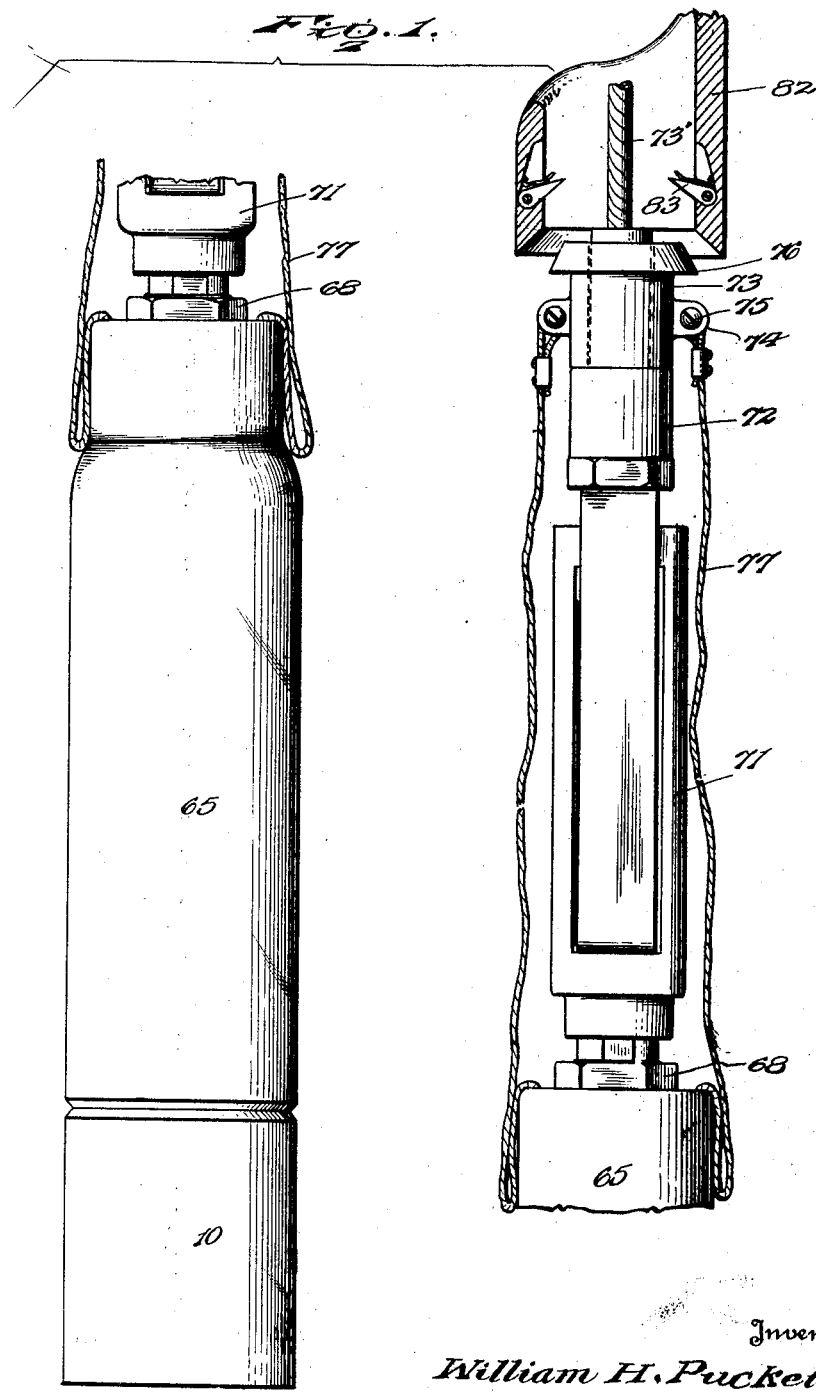
Inventor
William H. Puckett.
By
Lacey & Lacey, Attorneys

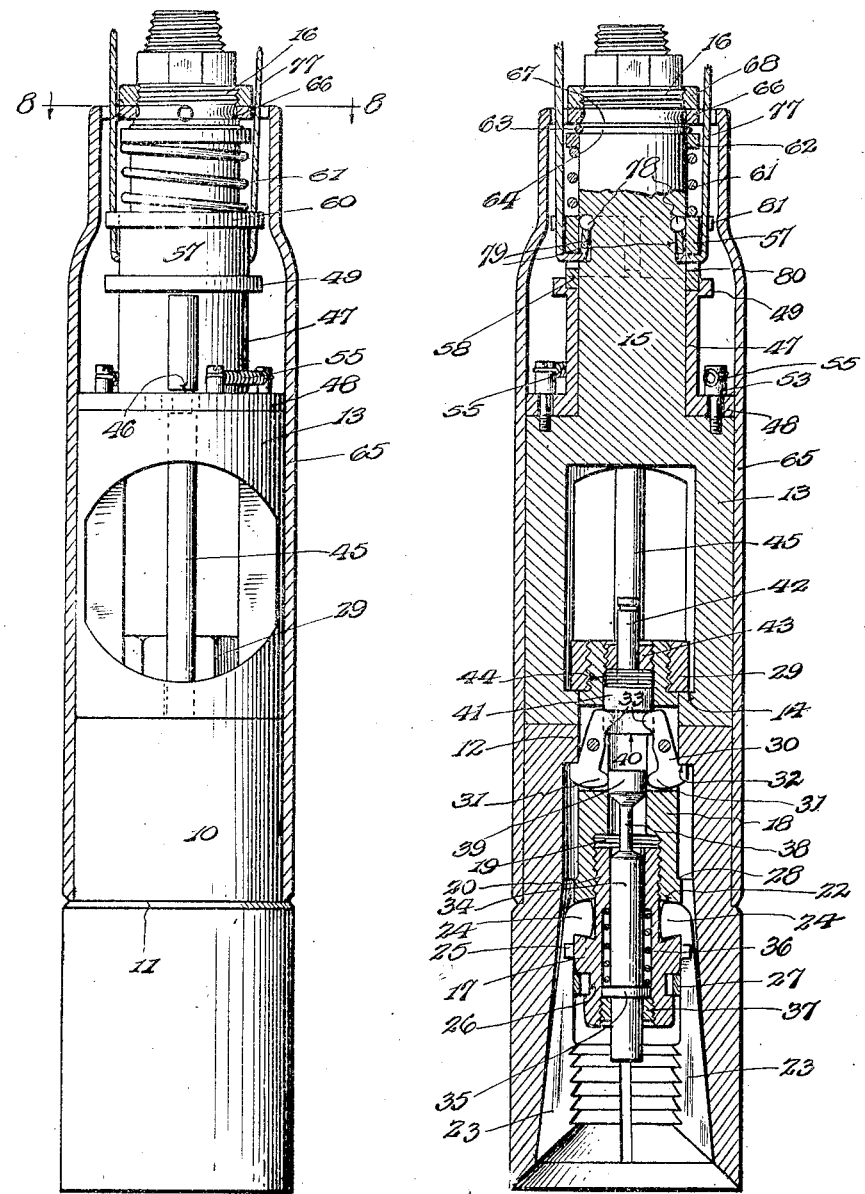

May 12, 1925.  
W. H. PUCKETT  
FISHING TOOL  
Filed March 5, 1924  
1,537,619  
5 Sheets-Sheet 3
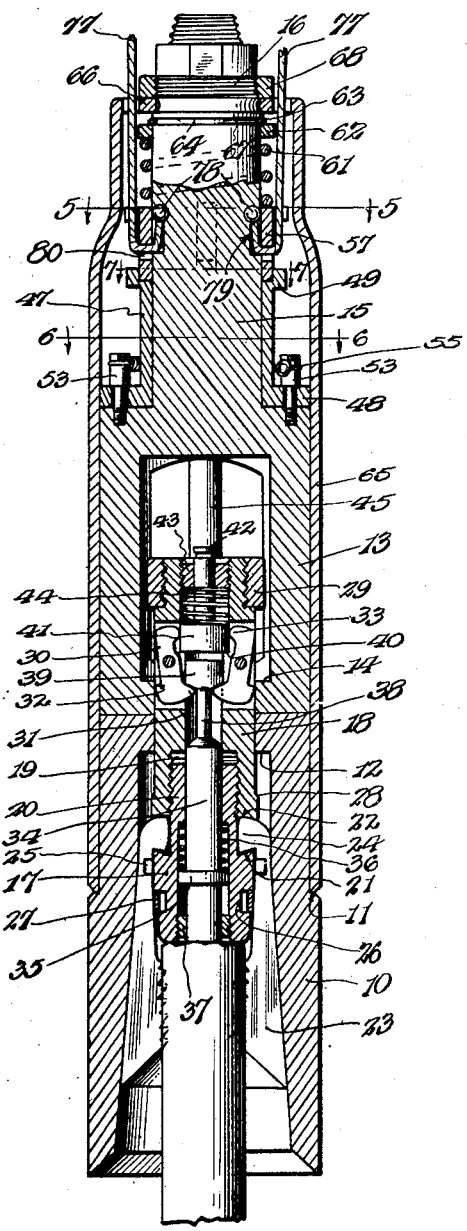
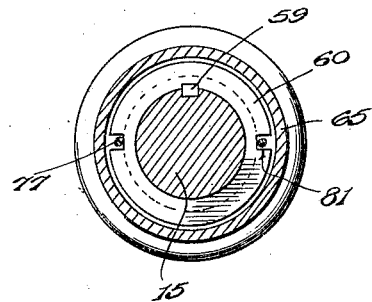
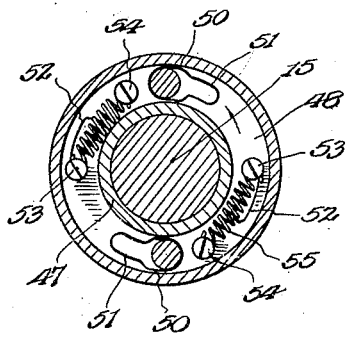
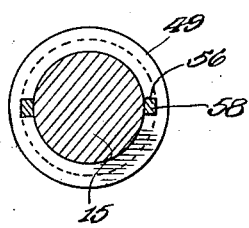
Inventor  
William H. Puckett.  
By Lacey & Lacey, Attorneys May 12, 1925.  
W. H. PUCKETT  
FISHING TOOL  
Filed March 5, 1924
1,537,619
5 Sheets-Sheet 4
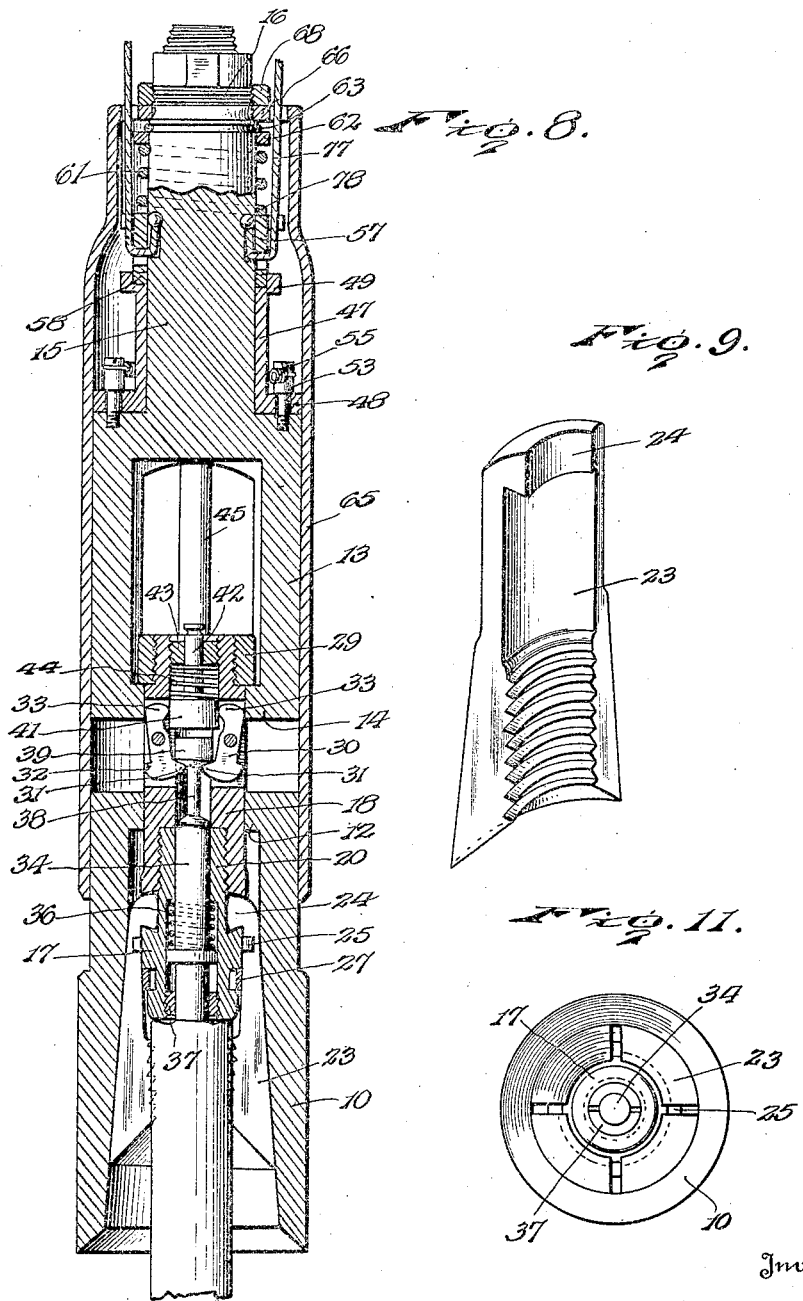
Inventor  
William H. Puckett.
By Lacy Lamy, Attorney May 12, 1925.
W. H. PUCKETT
FISHING TOOL
Filed March 5, 1924
1,537,619
5 Sheets-Sheet 5
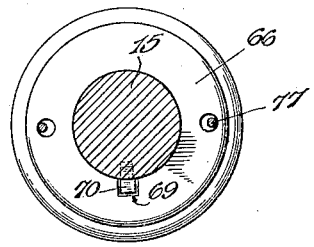
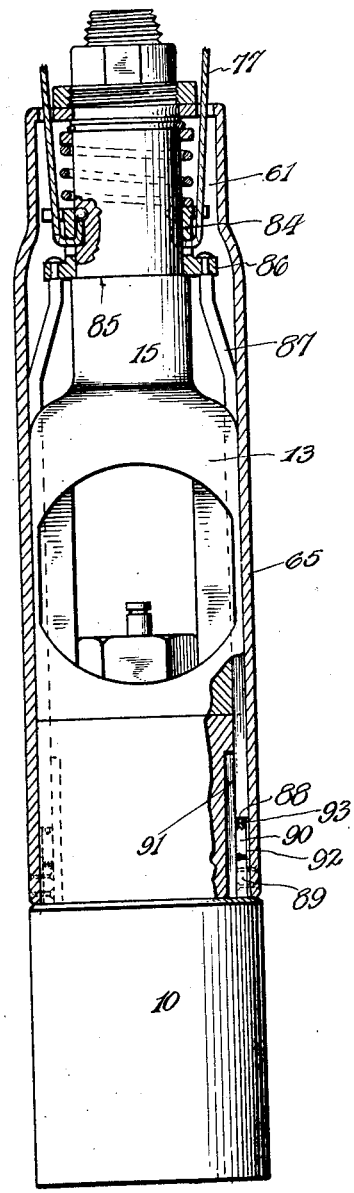
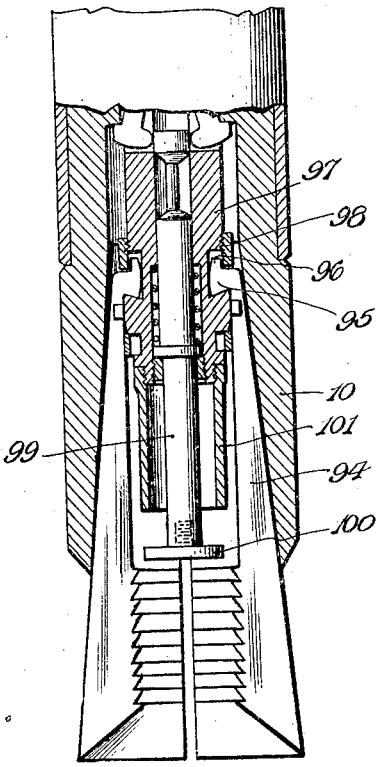
Inventor
*William H. Puckett.*
By *Lacey & Lacey*, Attorneys Patented May 12, 1925.

1,537,619

UNITED STATES PATENT OFFICE.

WILLIAM H. PUCKETT, OF HOLDENVILLE, OKLAHOMA.

FISHING TOOL.

Application filed March 5, 1924. Serial No. 697,089.

*To all whom it may concern:*

Be it known that I, WILLIAM HENRY PUCKETT, a citizen of the United States, residing at Holdenville, in the county of Hughes and State of Oklahoma, have invented certain new and useful Improvements in Fishing Tools, of which the following is a specification.

This invention relates to an improved deep well fishing tool and seeks, among other objects, to provide a tool which will engage and grip an object in a well regardless of the exact cross sectional shape of the object or whether the object is lying upon the bottom of the well, so that the tool may thus be successfully employed for removing practically any obstruction as commonly experienced in well drilling operations.

The invention seeks, as a further object, to provide a tool wherein the jaws of the device may be positively forced and clamped into engagement with the object to be withdrawn so that slipping of the tool will be avoided and wherein the tool will be so formed and constructed as to effectually withstand extreme pounding action thereon as may be employed for setting the jaws.

Another object of the invention is to provide a tool which may be set for insertion in a well to engage over an object therein and which will embody a tripping mechanism operable upon contact with the object to release certain parts of the tool with respect to each other so that the jaws may be forced into engagement with the object while pull upon the tool, for withdrawing the object, will be communicated directly to the jaws.

Still another object of the invention is to provide a tool wherein, should it be found impossible to remove an object from a well or if for any other reason it should be desired to withdraw the tool, the tool may be freed from the object.

And the invention seeks, as a still further object, to provide a tool which will, after insertion in a well, be free from failure even though subjected to tough usage or even abuse, and which will be well adapted for a wide range of use.

Other and incidental objects will appear hereinafter.

In the drawings:

Figure 1 is a side elevation of my improved tool, showing conventional jars in connection therewith, Figure 2 is a side elevation, the jacket of the device being illustrated in section, Figure 3 is a longitudinal sectional view taken medially through the device, showing the tool set for insertion in a well, Figure 4 is a view similar to Figure 3 showing the coupling mechanism of the tool tripped and illustrating the jaws of the device engaged with a rod, Figure 5 is a transverse sectional view on the line 5—5 of Figure 4, looking in the direction of the arrows, Figure 6 is a transverse sectional view on the line 6—6 of Figure 4, looking in the direction of the arrows.

Figure 7 is a detail sectional view on the line 7—7 of Figure 4, looking in the direction of the arrows, Figure 8 is a sectional view similar to Figure 4, showing the position of the parts when upward strain is exerted on the tool for pulling an object from a well, Figure 9 is a detail perspective view showing one of the slips or jaws of the tool, Figure 10 is a detail sectional view on the line 8—8 of Figure 2, looking in the direction of the arrows, Figure 11 is a bottom plan view of the tool, Figure 12 is a view shown partly in section and partly in elevation and illustrating a slight modification of the invention, and Figure 13 is a fragmentary sectional view showing a further slight modification.

In carrying the invention into effect, I employ a cylindrical sleeve or shell 10 having a beveled lower end edge so that the shell will readily ride over an object in a well and formed on the shell is an external shoulder 11. Throughout the major portion of its length, the internal diameter of the shell is gradually enlarged toward the lower end of the shell so that the shell is thus provided with a beveled inner face and formed on the shell at its upper end is an annular flange 12. In conjunction with the shell, I employ a cylindrical plunger or yoke 13 which is provided at its lower end with an annular flange 14 and rising from the upper end of the yoke is a cylindrical stem 15 terminating in a threaded collar 16. Slidably fitting through the flanges 12 and 14 of the shell and plunger is a core which, in the present instance, is formed of tubular sections 17 and 18 respectively. At its lower end, the section 18 is provided with a socket 19 while the section 17 is formed with a reduced neck 20 screwed into said socket. In thus reducing the section 17, a beveled annular shoulder 21 is defined which slopes downwardly toward the neck and, as will now be observed, the lower end edge of the section 18 is cut on a slight radius to form a confronting annular rounded shoulder 22. Swung upon the section 17 of the core is a set of mating slips or jaws 23 gradually thickened toward their lower ends and provided with smooth outer faces to fit the tapered bore of the shell 10 while the inner faces of the slips are formed with wickers or otherwise roughened. At their lower end edges the slips are beveled so as to readily ride over an object in a well, and formed on the slips at their upper ends are inwardly directed overhanging lugs 24 having beveled lower edges to coact with the beveled shoulder 21 of the core section 17 and slightly rounded upper edges to confront the rounded shoulder 22 at the lower end of the section 18. Thus, the section 17 of the core may be adjusted upon the section 18 for confining the lugs 24 in the annular groove defined by the shoulders 21 and 22 while, at the same time, the lugs will swingingly support the slips, and, in this connection, attention is directed to the fact that when an upward pull is brought to bear upon the slips, the beveled lower edges of the lugs will tend to ride down the shoulder 21 for maintaining the slips in engagement with the core. Projecting from the section 17 between the slips, are spacing studs 25 separating the slips and formed in the lower end of said section is an annular groove 26 in which is accommodated a flat spring 27 pressing the slips outwardly against the shell. As will be perceived, by detaching the section 17 of the core from the section 18, the slips may be readily removed. Formed on the section 18 near its lower end is an external annular shoulder 28 to coact with the flange 12 of the shell for limiting the core in its upward movement and screwed on said section at its upper end is a nut 29 to coact with the flange 14 of the plunger 13 for limiting the core in its downward movement.

Pivoted in suitable slots in the core section 18 is a pair of double-ended latch members 30 arranged at opposite sides of said section near the upper end of the core. At their lower ends, these latch members are formed with inwardly directed toes 31 projecting at the inner edges of said members, while at their outer edges the members are provided with shoulders 32. Formed on the members at their upper ends to overhang the inner edges of the members are inwardly directed toes 33. Slidably fitting in the core is a tripping plunger 34 provided near its lower end with an annular shoulder 35. The core section 17 is counterbored from the lower end thereof to slidably receive said shoulder and acting against the shoulder is a spring 36 pressing the plunger downwardly. Screwed into the core section at the lower end thereof is a nut 37 to coact with the shoulder 35 for limiting the plunger against downward displacement, the nut slidably receiving the plunger therethrough. Formed on the plunger at its upper end portion is a reduced stem or neck 38 at the upper extremity of which is provided a cylindrical head 39 slidably fitting in the bore of the core and provided at its lower end with a beveled face to coact with the toes 31 of the latch members 30. At its upper end portion, the section 18 of the core is counterbored to form an annular shoulder 40 and slidably fitting in said core section is a locking plunger 41 from which rises a stem 42. Screwed into the core section at its upper end is a nut 43 slidably receiving said stem therethrough and acting between said nut and the plunger is a spring 44 pressing the plunger downwardly to normally rest against the shoulder 40 between the toes 33 of the latch members 30.

Rigidly fixed at their lower ends to the upper end of the shell 10 is a pair of upstanding coupling rods 45 which extend freely through the plunger 13 at opposite sides thereof. These rods are disposed in parallel relation to the axis of the plunger and are formed near their upper ends, as particularly shown in Figure 2, with annular channels or grooves 46. Fitting the stem 15 of the plunger to coact with said rods is a rotary latch member 47 provided at its lower end with a flange 48 resting flat upon the upper end of the plunger while at its upper end said member is provided with a smaller flange 49. As brought out in Figure 6, the flange 48 of the latch member is provided at opposite sides thereof with keyhole slots to accommodate the rods, these slots being formed with elongated large portions 50 from which extend restricted portions 51. As also brought out in Figure 6, the flange 48 of the latch member is further provided with slots 52 and extending freely through said slots are studs 53 screwed into the upper end of the plunger. Upstanding from the flange in spaced relation to the studs 53 are studs 54 and extending between said studs are springs 55 which, as will be seen, will rotate the latch 47 in a counter-clockwise direction. Formed in the flange 49 of the latch member at opposite sides thereof is, as shown in detail in Figure 7, a pair of sockets 56 and slidable upon the stem 15 of the plunger to coact with the latch member is a locking collar 57 provided at its lower end with depending lugs 58 to engage in said sockets. As shown in detail in Figure 5, the collar 57 is secured against rotation upon the stem 15 by a key 59 and formed on the collar at its upper end is an overhanging flange 60. Surrounding the stem 15 to bear against said flange is a spring 61 and slipped over the stem to form an abutment for said spring is a collar 62 retained by a split resilient ring 63 removably engaging in a groove 64 in the stem. Thus, the spring 61 presses the collar 57 downwardly to maintain the lugs 58 thereof engaged in the sockets 56 of the latch member 47 so that since the collar is held against rotation by the key 59, the latch member will be normally locked against rotation under the influence of the springs 55. Slidably fitting over the plunger 15 and over the upper end portion of the shell 10 is a jacket 65, the lower end edge of which confronts the shoulder 11 of the shell while at its upper end the jacket is provided with a flange 66 to freely surround the stem 15 of the plunger resting against a bead 67 on said stem, and screwed upon the collar 16 of the stem is a nut 68 securing the jacket in position. As shown in Figure 8, the flange 66 of the jacket is provided with a notch 69 and screwed into the stem to project into said notch is a stud 70 locking the jacket against rotation.

In Figure 1 of the drawings, I have illustrated conventional jars 71 in conjunction with the tool. One of the jars is screwed onto the collar 16 of the stem 15 of the plunger 13 and screwed onto the other of the jars is the usual rope clamp 72, to which is connected the operating rope or cable 73'. In conjunction with the rope clamp 72, I provide releasing mechanism for the rotary latch 47. Slidably fitting over the reduced upper end portion of the clamp is a split sleeve 73, the companion sections of which are formed with lugs 74 and extending through said lugs are fastening elements 75 detachably connecting the sections of the sleeve, the sectional construction of the sleeve being adapted to facilitate the mounting of the sleeve upon the rope clamp. Formed on the sleeve at its upper end is an annular flange 76 and connected with the fastening elements 75 is a pair of cables or other approved flexible elements 77. The flange 66 of the jacket 65 is provided at opposite sides thereof with openings to freely receive the cables and formed on or otherwise secured to the cables at their free ends are knobs 78. Formed in the stem 15 of the plunger 13 at opposite sides thereof, are keyhole slots 79, the larger ends of which are presented upwardly, and formed in the collar 57 near its lower edge to register with said slots are openings 80, above which the flange 60 of the collar is, as shown in Figure 5, provided with notches 81 for the cables. The larger ends of the slots 79 are of a size to accommodate the knobs 78 of the cables so that by lifting the collar 57 the knobs may be inserted through the openings 80 of the collar and positioned in the upper ends of the slots when, upon the release of the collar, the collar will shift downwardly to its normal position and crowd the adjacent end portions of the cables into the restricted lower end portions of the slots. Thus, the collar will normally overlie the knobs for detachably securing the cables at their adjacent ends.

In conjunction with the sleeve 73, I further provide, as shown in Figure 1, a grab 82. The specific details of this grab are not important, it being sufficient to state that the grab may be arranged to surround the cable 73' and is equipped with spring pressed dogs 83 to ride over the flange 76 and engage therebeneath when the grab is lowered into a well over the sleeve 73, so that the grab may then be drawn upwardly with the sleeve thereon.

In use, the plunger 13 is, as shown in Figure 3, shifted to abut the shell 10 while the core is moved downwardly through the flanges 12 and 14 of the shell and plunger until the nut 29 rests upon the latter flange. The tool is then set by elevating the plunger 41. Any suitable tool may be engaged with the stem 42 of said plunger for lifting the plunger and, as will now be seen, when the plunger is lifted, the spring 36 will immediately shift the plunger 34 downwardly so that the beveled lower face of the head 39 of the plunger 34 will coact with the toes 31 of the latch members 30 for swinging said latch members outwardly at their lower ends and engaging the shoulders 32 of said latch members beneath the flange 12 of the shell. The shell will thus be rigidly locked in elevated position upon the core while, at the same time, the shell and plunger will be rigidly locked against relative movement in abutting relation. When the plunger 34 is shifted downwardly by the spring 36, the lower end of the plunger will be projected at the lower end of the core while the head 39 of the plunger will be moved to a position between the ends of the toes 31 of the latch members 30 so that the latch members will be locked against accidental release from the flange 12 of the shell while, at the same time, the upper end portions of the latch members will be maintained in convergent relation so that the toes 33 of said members will project beneath the plunger 41 for sustaining said plunger in elevated position. The latch member 47 is, of course, set in locked position held by the collar 57, in which position of the latch member the portions 50 of the keyhole slots in the flange 48 of said member will, as shown in Figure 6, be disposed to accommodate the rods 45. As thus set, the tool is ready for insertion in a well.

Upon being lowered into contact with an object in a well, such for instance as a rod, as conventionally illustrated in Figure 4, the beveled lower end of the shell 10 as well as the beveled lower edges of the slips 23 will direct the tool over the object until said object is received between the slips to engage the plunger 34. The plunger will thus be forced upwardly against the tension of the spring 36 so that the head 39 of said plunger will be elevated from between the ends of the toes 31 of the latch members 30. The latch members will accordingly be freed for swinging movement when the plunger 41 will, under the influence of the spring 44, be shifted downwardly between the toes 33 of the latch members. The latch members will thus be swung inwardly at their lower ends out of engagement with the flange 12 of the shell 10, freeing the plunger 13 for movement relative to the shell while the toes 31 of the latch members will be projected beneath the head 39 of the plunger 34 for holding such plunger in elevated position. The plunger 41 will, of course, be shifted by its spring 44 to rest against the shoulder 40 between the ends of the toes 33 of the latch members locking said latch members in retracted position. Accordingly, during the subsequent operation of the tool, the latch members cannot become freed or swung by the action of the spring pressed plunger 34 and, in fact, said latch members cannot be released until the plunger 41 is again manually elevated for setting the tool.

As will be seen, the plunger 34 constitutes a tripping device whereby the release of the plunger 13 for independent movement relative to the shell 10 is, after the slips 23 have been engaged over the object in the well, automatically effected. Accordingly, the jars 71 may then be operated in the usual manner for raising and lowering the plunger 13 and, in conjunction with the pounding action of the plunger against the shell 10, driving the shell downwardly over the slips 23. When the shell is thus driven downwardly, the wickers of the slips will, of course, be forced into firm engagement with the object and tightly wedged by the shell against slipping. Accordingly, upward pull may then be exerted on the cable 73 for withdrawing the object from the well and, in this connection, particular attention is directed to the fact that when the tool is thus lifted, the flange 14 of the plunger 13 will as shown in Figure 8, move into engagement with the nut 29 of the slip supporting core so that the pull upon the tool will be communicated directly through the core to the slips. Accordingly, the shell 10 will remain undisturbed, wedging the slips in engagement with the object.

Assuming now that the object caught in the well cannot be withdrawn and it is desired to release the tool therefrom, the grab 82 is lowered over the sleeve 73 to engage the dogs 83 beneath the flange 76 of said sleeve when the grab is drawn upwardly and, if desired, is removed from the well. When the grab is thus drawn upwardly, the sleeve 73 will, of course, be lifted therewith so that an upward pull will be exerted on the cables 77. Upward pull upon these cables will, as will be seen, lift the collar 57 so that the lugs 58 of the collar will be withdrawn from the sockets 56 of the rotary latch member 47, releasing the latch member. As the upward pull upon the cables 77 is continued, the collar 57 will be lifted until the openings in the collar are brought opposite the enlarged upper ends of the slots 79, when the knobs 78 will be withdrawn through said openings, freeing the collar as well as the cables so that said knobs, as the upward lift upon the sleeve 73 is continued, will pass out through the openings in the flange 66 of the jacket 65 and thereby permit the complete withdrawal of the grab 82 and sleeve 73 from the well. Immediately upon the release of the latch member 47, the springs 55 will rotate said member in a counter-clockwise direction so that if, at the time, the plunger 13 is resting upon the upper end of the shell 10, the flange 48 will be turned to engage the flange with the rods 45 at the channels 46 in said rods, the restricted portions 51 of the keyhole slots in said flange being wide enough to freely accommodate the restricted portions of the rods at the channels. On the contrary, should the plunger 13 be in elevated position with respect to the shell 10 when the latch member 47 is released, said latch member will be only partially rotated by the springs 55 as would, under such circumstances, be permitted by the elongated large portions 50 of the keyhole slots in the flange 48. In the elevated position of the plunger 13, the flange 48 of the latch member 47 will, of course, be disposed above the channels 46 in the rods 45 so that the flange cannot move into engagement with the rods. Accordingly, it will be seen that unless the latch member 47, under such conditions, was permitted to turn slightly when released by the collar 57, the lugs 58 of said collar would, upon the release of the collar by the cables 77, return into the sockets 56 of the latch member and again lock the member. However, this contingency is avoided by elongating the large portions 50 of the keyhole slots in the flange 48 of the latch member so that should the plunger be elevated and the latch member 47 is released by the raising of the collar 57, the latch member will be permitted to turn slightly before the collar 57 is released by the cables 77. This slight turning of the latch member 47 will dispose the sockets 56 of the latch member out of alinement with the lugs so that when the collar 57 is returned by the spring 61, the lugs 58 will ride against the flange 49 of the latch member. Accordingly, when the plunger 13 is subsequently lowered to abut the shell 10, and the flange 48 of the latch member 47 is brought into the plane of the channels 46 of the rods 45, the rotation of the latch member will be immediately completed by the springs 55 for engaging said flange with the rods. Upon the engagement of the flange of the latch member with the rods 45, the plunger 13 will, as will be seen, be locked against movement relative to the shell 10 rigidly coupled with the shell through said latch member and the rods. Accordingly, upward pull upon the tool will then be communicated directly through the rods 45 to the shell 10 with the result that the shell will be drawn upwardly over the slips 23 for freeing the slips, when the tool may be withdrawn. I accordingly provide a particularly effective tool for the purpose set forth and, in this connection, it is to be noted that since the slips of the tool are detachably mounted, the slips may be interchanged or other slips substituted therefor such as may be particularly adapted for the work at hand.

In Figure 12 of the drawings, I have illustrated a slightly different embodiment of the invention incorporating a modified latch mechanism for coupling the shell and plunger of the tool against relative movement for release of the tool. The rods 45, latch member 47, collar 57, and associated parts, are eliminated and in lieu of the collar 57 I provide a collar 84 which slidably fits the stem 15 of the plunger 13 and is normally held against a shoulder 85 on the stem by the spring 61, as in the preferred embodiment of the invention. The collar 84 is identical with the collar 57 with the exception that the collar 84 is provided with a lower flange 86 to which is rigidly connected a pair of rods 87.

The shell 10 and plunger 13 are grooved at opposite sides thereof to slidably accommodate said rods and formed on the rods at their lower ends are studs 88. Riveted or otherwise secured to the jacket 65 at its lower end are blocks 89 upon which are hinged latch members 90 and formed in the upper end portion of the shell to accommodate said members are short slots 91. Secured by the blocks 89 to extend behind the latch members are springs 92 tending to press the members outwardly into the slots and formed in the upper ends of the members to removably receive the studs 88 of the rods 87 are sockets 93. Thus, the spring 61 will act against the collar 84 for normally maintaining the studs 88 of the rods 87 engaged in said sockets. However, when the collar is lifted by means of the cables 77, the rods 87 will be elevated to free the latch members, when the upper ends of the members will be swung into the slots 91 of the shell. Accordingly, when upward pull is exerted upon the tool, the latch members will ride to the upper ends of said slots into engagement with the upper end walls thereof rigidly coupling the plunger and shell, when the pull upon the tool will be communicated directly through the jacket 65 and latch members 90 to the shell 10 for lifting the shell upwardly over the slips of the tool for freeing said slips and releasing the tool. Otherwise, this embodiment of the invention is identical with the preferred construction.

In Figure 13 of the drawings, I have illustrated a further slightly different embodiment of the invention. In this latter embodiment, I provide elongated slips 94 which are of a length to project below the lower end of the shell so that the slips may, for instance, be engaged with an object lying upon the bottom of a well. The slips 94 are provided at their upper ends with lugs 95 and, although longer than the slips 23, are otherwise identical therewith with the exception that the lugs 95 are formed at their upper sides with upstanding shoulders 96. In conjunction with the elongated slips 94, I provide a core 97 which is identical with the core as employed in the structure first described with the exception that the core 97 is formed in one piece and is channeled to freely accommodate the lugs 95 of the slips. Screwed upon the core to depend in front of the shoulders 96 of said lugs is a collar 98 detachably connecting the slips with the core, clearance being provided to permit the proper swinging movement of the slips relative to the axis of the core. I further provide an elongated plunger 99 which is identical with the plunger 34, except for its length and is mounted in like manner to serve the same purpose. As will be observed, the plunger 99 extends a considerable distance below the core 87 for engagement by an object entering between the slips 94, and screwed into the lower end of the plunger is an end plate 100. This end plate is provided in order that, should it be desired to remove a pipe or other hollow object from a well, the plate will contact the end edge of the pipe or object to effect the tripping of the plunger. Screwed into the lower end of the core 97 to surround the plunger, is a spacing sleeve 101 which, when the plunger is tripped, will be engaged by the end plate 100 of the plunger for limiting the plunger in its upward movement, thereby avoiding possible injury to the plunger spring. Furthermore, it is to be noted that when the plunger is elevated and the plate 100 is moved up to abut the sleeve 101 by an object entering between the jaws 94, the sleeve will bear between the object and the core 97 for rigidly supporting the core and consequently supporting the jaws against the downward thrust of the sleeve when driven over the jaws. Mutilation of the wickers of the jaws will thus be prevented. Otherwise, this modified structure is identical with the preferred embodiment of the invention and further description is accordingly believed unnecessary.

Having thus described the invention, what I claim is:

1. A fishing tool including a driving element, gripping jaws coupled therewith, means to coact with the jaws and shiftable by said element for closing the jaws, and means slidably coacting with said driving element and said jaw closing means coupling said element with said jaw closing means and supporting said jaws.

2. A fishing tool including a driving element, gripping jaws coupled therewith, means to coact with the jaws and shiftable by said element for closing the jaws, means slidably coupling said driving element and said jaw closing means and supporting said jaws, and latch mechanism carried by said coupling means for securing said element and said jaw closing means against relative movement.

3. A fishing tool including a driving element, gripping jaws coupled therewith, means to coact with the jaws and shiftable by said element for closing the jaws, means slidably coupling said driving element and said jaw closing means and supporting said jaws, latch mechanism carried by said coupling means for securing said element and said jaw closing means against relative movement, and means for tripping said latch mechanism.

4. A fishing tool including a driving element, gripping jaws coupled therewith, means to coact with the jaws and shiftable by said element for closing the jaws, means slidably coupling said driving element and said jaw closing means and supporting said jaws, latch mechanism carried by said coupling means for securing said element and said jaw closing means against relative movement, and tripping means for said latch mechanism projecting adjacent said jaws for actuation by an object entering between the jaws.

5. A fishing tool including a driving element, gripping jaws coupled therewith, means to coact with the jaws and shiftable by said element for closing the jaws, means slidably coupling said driving element and said jaw closing means and supporting said jaws, latch mechanism carried by said coupling means for securing said element and said jaw closing means against relative movement, and tripping means for said latch mechanism slidable upon said coupling means and projecting adjacent the jaws for actuation by an object entering between the jaws.

6. A fishing tool including a driving element, coacting gripping jaws, means carried by said element supporting the jaws, means to coact with the jaws and shiftable by said element relative to the jaws for closing the jaws, and latch mechanism carried by said supporting means for securing said element and said jaw closing means against relative movement.

7. A fishing tool including a driving element, coacting gripping jaws, means carried by said element supporting the jaws, means to coact with the jaws and shiftable by said element relative to the jaws for closing the jaws, latch mechanism carried by said supporting means for securing said element and said jaw closing means against relative movement, and means carried by said supporting means for tripping said latch mechanism.

8. A fishing tool including a driving element, coacting gripping jaws, means carried by said element supporting the jaws, means to coact with the jaws and shiftable by said element relative to the jaws for closing the jaws, and a pivoted latch carried by said supporting means for securing said element and said jaw closing means against relative movement.

9. A fishing tool including a driving element, coacting gripping jaws, means carried by said element supporting the jaws, means to coact with the jaws and shiftable by said element relative to the jaws for closing the jaws, a pivoted latch carried by said supporting means for securing said element and said jaw closing means against relative movement, and a plunger slidable upon the supporting means for tripping said latch.

10. A fishing tool including a driving element, coacting gripping jaws, means carried by said element supporting the jaws, means to coact with the jaws and shiftable by said element relative to the jaws for closing the jaws, latch mechanism carried by said supporting means for securing said element and said jaw closing means against relative movement, and means for tripping said latch mechanism but normally holding said mechanism active.

11. A fishing tool including a driving element, coacting gripping jaws, means carried by said element supporting the jaws, means to coact with the jaws and shiftable by said element relative to the jaws for closing the jaws, latch mechanism carried by said supporting means for securing said element and said jaw closing means against relative movement, means for tripping said latch mechanism, and means for locking said latch mechanism inactive when tripped.

12. A fishing tool including a driving plunger, coacting gripping jaws, a shell to coact with said jaws and shiftable by the plunger for closing the jaws, and a core supporting said jaws and connecting the plunger and shell for relative movement.

13. A fishing tool including a driving plunger, coacting gripping jaws, a shell to coact with said jaws and shiftable by the plunger for closing the jaws, a core supporting said jaws and connecting the plunger and shell for relative movement, and latch mechanism carried by the core for securing the shell and plunger against relative movement.

14. A fishing tool including a driving plunger, coacting gripping jaws, a shell to coact with said jaws and shiftable by the plunger for closing the jaws, a core supporting said jaws and connecting the plunger and shell for relative movement, and latch mechanism carried by the core to coact with the shell for securing the core, plunger and shell against relative movement.

15. A fishing tool including a driving plunger, coacting gripping jaws, a shell to coact with said jaws and shiftable by the plunger for closing the jaws, a core supporting said jaws and connecting the plunger and shell for relative movement, latch mechanism carried by the core for securing the shell and plunger against relative movement, and means carried by the core for freeing said latch mechanism.

16. A fishing tool including a driving plunger, coacting gripping jaws, a shell to coact with said jaws and shiftable by the plunger for closing the jaws, a core supporting said jaws and connecting the plunger and shell for relative movement, latch mechanism carried by the core for securing the shell and plunger against relative movement, and means carried by the core normally locking said latch mechanism active and movable to free said mechanism.

17. A fishing tool including a driving plunger, coacting gripping jaws, a shell to coact with said jaws and shiftable by the plunger for closing the jaws, a core supporting said jaws and connecting the plunger and shell for relative movement, latch mechanism carried by the core for securing the shell and plunger against relative movement, and a plunger slidable upon the core for freeing said latch mechanism.

18. A fishing tool including a driving plunger, coacting gripping jaws, a shell to coact with said jaws and shiftable by the plunger for closing the jaws, a core supporting said jaws and connecting the plunger and shell for relative movement, latch mechanism carried by the core for securing the shell and plunger against relative movement, and a plunger slidable upon the core and normally locking said latch mechanism active but movable to free said mechanism.

19. A fishing tool including a driving plunger, coacting gripping jaws, a shell to coact with said jaws and shiftable by the plunger for closing the jaws, a core supporting said jaws and connecting the plunger and shell for relative movement, latch mechanism carried by the core for securing the shell and plunger against relative movement, a plunger slidable upon the core and movable to free said latch mechanism, and means for automatically locking the latch mechanism inactive when freed.

20. A fishing tool including a driving plunger, coacting gripping jaws, a shell to coact with said jaws and movable by the plunger for closing the jaws, a core supporting said jaws and connecting the plunger and shell for relative movement, latch mechanism carried by the core for securing the plunger and shell against relative movement, a tripping plunger for freeing said latch mechanism, and a locking plunger carried by the core for locking said latch mechanism inactive when freed.

21. A fishing tool including a driving plunger, coacting gripping jaws, a shell to coact with said jaws and shiftable by the plunger for closing said jaws, a core connecting the plunger and shell for relative movement, a latch pivoted upon the core, a tripping plunger spring pressed downwardly upon the core and normally tending to swing the latch to active position coacting with the shell for securing the driving plunger and shell against relative movement but shiftable upwardly for freeing the latch, and a spring pressed plunger movable to coact with the latch when freed for locking the latch inactive.

22. A fishing tool including a driving plunger, coacting gripping jaws, a shell to coact with said jaws and shiftable by the plunger for closing the jaws, a core supporting said jaws and connecting the plunger and shell for relative movement, a latch pivoted upon the core, a tripping plunger spring pressed downwardly upon the core to coact with the latch for shifting the latch to active position locked by the tripping plunger to coact with the shell for securing the shell and said driving plunger against relative movement, the tripping plunger being movable upwardly upon the core for freeing said latch, and a spring pressed locking plunger carried by the core and movable to coact with the latch when freed for locking the latch inactive.

23. In a fishing tool, a driving plunger, coacting gripping jaws, a shell to coact with said jaws and shiftable by the plunger for closing the jaws, a core supporting said jaws and connecting the plunger and shell for relative movement, latch mechanism carried by the core and spring pressed to active position securing the shell and plunger against relative movement, and means normally locking said latch mechanism inactive.

24. In a fishing tool, a driving plunger, coacting gripping jaws, a shell to coact with said jaws and shiftable by the plunger for closing the jaws, a core supporting said jaws and connecting the plunger and shell for relative movement, a latch pivoted upon the core, a tripping plunger spring pressed downwardly upon the core to coact with the latch for shifting the latch to active position securing the shell and said driving plunger against relative movement, the tripping plunger being movable upwardly for freeing the latch, and a locking plunger movable upon the core to coact with the latch for locking the latch in inactive position holding the tripping plunger elevated.

25. A fishing tool including a driving plunger, coacting gripping jaws, a shell to coact with said jaws and shiftable by the plunger for closing the jaws, a core supporting said jaws and connecting the plunger and shell for relative movement, a latch pivoted upon the core, a tripping plunger spring pressed downwardly upon the core for shifting the latch to active position and locking the latch in such position securing the shell and driving plunger against relative movement, the tripping plunger being movable upwardly for freeing the latch, and a locking plunger spring pressed downwardly to coact with the latch locking the latch in inactive position holding the tripping plunger elevated, the locking plunger being manually shiftable upwardly to elevated position supported by the latch.

26. In a fishing tool, the combination with gripping jaws, a shell for closing the jaws, and a driving plunger to impact the shell, of means coupling the plunger and shell for relative movement and supporting the jaws, means for locking the shell and plunger against relative movement, and means for freeing said locking means.

27. In a fishing tool, the combination with gripping jaws, a shell for closing the jaws, and a driving plunger to impact the shell, of means coupling the plunger and shell for relative movement and supporting the jaws, means for locking the shell and plunger against relative movement, and means operable by an object entering between the jaws for automatically freeing said locking means.

28. In a fishing tool, the combination with gripping jaws, a shell for closing the jaws, and a driving plunger to impact the shell, of means coupling the plunger and shell for relative movement and supporting the jaws, means for locking the shell and plunger against relative movement, means for automatically freeing said locking means, and means for automatically locking said locking means inactive.

29. In a fishing tool, the combination with gripping jaws, a shell for closing the jaws, and a driving plunger to impact the shell, of means coupling the plunger and shell for relative movement and supporting the jaws, means for locking the plunger and shell against relative movement, means for automatically shifting said locking means to active position and operable by an object entering between the jaws for freeing the locking means, and means for automatically locking said locking means when freed.

30. In a fishing tool, the combination with a shell, a plunger for impacting the shell, and means slidably coacting with the shell and plunger and coupling the shell and plunger for relative movement, of coacting gripping jaws freely mounted on said coupling means and closeable by the shell.

31. In a fishing tool, the combination with a shell, a plunger for impacting the shell, and means coupling the shell and plunger for relative movement, of coacting gripping jaws mounted on said coupling means and closeable by the shell but separate from the coupling means.

32. In a fishing tool, the combination with a shell, a plunger for impacting the shell, and means coupling the shell and plunger for relative movement, of coacting gripping jaws carried by said coupling means and freely detachable therefrom, the jaws being closeable by the shell.

33. In a fishing tool, the combination with a shell, and a plunger for impacting the shell, of a core connecting the plunger and shell for relative movement, and coacting gripping jaws loosely mounted on the core for free disconnection therefrom and closeable by the shell.

34. In a fishing tool, the combination with a shell, and a plunger for impacting the shell, of a core connecting the plunger and shell for relative movement and provided with a groove, and coacting gripping jaws having lugs loosely confined in said groove connecting the jaws with the core, the jaws being closeable by the shell.

35. In a fishing tool, a shell, coacting gripping jaws movable by the shell to gripped position held by the shell, a driving plunger to impact the shell, means coupling the shell and plunger for relative movement and supporting said jaws, and means whereby the shell may be retracted to free the jaws.

36. In a fishing tool, a shell, coacting gripping jaws movable by the shell to gripped position held by the shell, a driving plunger to impact the shell, means coupling the shell and plunger for relative movement and supporting said jaws, and means for connecting the plunger with the shell independently of said coupling means whereby the shell may be retracted to free the jaws.

37. In a fishing tool, a shell, coacting gripping jaws movable by the shell to gripped position held by the shell, a driving plunger to impact the shell, means coupling the shell and plunger for relative movement and supporting said jaws, and means for locking the plunger against movement relative to the shell when the jaws are in gripped position whereby the shell may be retracted to free the jaws.

38. In a fishing tool, a shell, coacting gripping jaws movable by the shell to gripped position held by the shell, a driving plunger to impact the shell, means coupling the shell and plunger for relative movement and supporting said jaws, and latch mechanism for connecting the plunger and shell independently of said coupling means whereby the shell may be retracted to free the jaws.

39. In a fishing tool, a shell, coacting gripping jaws movable by the shell to gripped position held by the shell, a driving plunger to impact the shell, means coupling the shell and plunger for relative movement and supporting said jaws, spring pressed latch mechanism for connecting the plunger and shell independently of said coupling means whereby the shell may be retracted to free the jaws, and locking means normally holding said latch mechanism set.

40. In a fishing tool, a shell, coacting gripping jaws movable by the shell to gripped position held by the shell, a driving plunger to impact the shell, means coupling the shell and plunger for relative movement and supporting said jaws, spring pressed latch mechanism for connecting the plunger and shell independently of said coupling means whereby the shell may be retracted to free the jaws, locking means normally holding said latch mechanism set, and means for releasing said locking means.

41. In a fishing tool, a shell, coacting gripping jaws movable by the shell to gripped position held by the shell, a driving plunger to impact the shell, means coupling the shell and plunger for relative movement and supporting said jaws, a rod carried by the shell, and a latch member carried by the plunger to engage said rod for connecting the plunger and shell independently of said coupling means whereby the shell may be retracted to free the jaws.

42. In a fishing tool, a shell, coacting gripping jaws movable by the shell to gripped position held by the shell, a driving plunger to impact the shell, means coupling the shell and plunger for relative movement and supporting said jaws, a rod carried by the shell, and a spring pressed latch member rotatable upon the plunger to engage said rod for connecting the plunger and shell independently of said coupling means whereby the shell may be retracted to free the jaws.

43. In a fishing tool, a shell, coacting gripping jaws movable by the shell to gripped position held by the shell, a driving plunger to impact the shell, means coupling the shell and plunger for relative movement and supporting said jaws, a rod carried by the shell, a spring pressed latch member rotatable upon the plunger to engage said rod for connecting the plunger and shell independently of said coupling means whereby the shell may be retracted to free the jaws, and a spring pressed collar splined on the plunger and normally engaging said latch member for holding the member set.

44. In a fishing tool, a shell, coacting gripping jaws movable by the shell to gripped position held by the shell, a driving plunger to impact the shell, means coupling the shell and plunger for relative movement and supporting said jaws, a rod carried by the shell, a spring pressed latch member rotatable upon the plunger to engage said rod for connecting the plunger and shell independently of said coupling means whereby the shell may be retracted to free the jaws, a spring pressed collar splined on the plunger and normally engaging said latch member for holding the member set, and means for releasing said collar.

45. In a fishing tool, a shell, coacting gripping jaws movable by the shell to gripped position held by the shell, a driving plunger to impact the shell, means coupling the shell and plunger for relative movement and supporting said jaws, a rod carried by the shell, a spring pressed latch member rotatable upon the plunger to engage said rod for connecting the plunger and shell independently of said coupling means whereby the shell may be retracted to free the jaws, a spring pressed collar splined on the plunger and normally engaging said latch member for holding the member set, and a cable detachably secured by the collar and operable for releasing the collar from the latch member as well as freeing the cable.

46. In a fishing tool, the combination of gripping jaws, a shell to coact therewith, a plunger for impacting the shell and shifting the jaws to gripped position held by the shell, means coupling the shell and plunger for relative movement and supporting said jaws, and means whereby the shell may be retracted to free the jaws.

47. In a fishing tool, the combination of gripping jaws, a shell to coact therewith, a plunger for impacting the shell and shifting the jaws to gripped position held by the shell, means coupling the shell and plunger for relative movement and supporting said jaws, and means operable to form a direct rigid connection between the plunger and shell whereby the shell may be retracted to free the jaws.

48. In a fishing tool, the combination of gripping jaws, a shell to coact therewith, a plunger for impacting the shell and shifting the jaws to gripped position held by the shell, means coupling the shell and plunger for relative movement and supporting said jaws, and rotary latch mechanism associated with the plunger for connecting the plunger and shell independently of said coupling means whereby the shell may be retracted to free the jaws.

49. In a fishing tool, the combination of gripping jaws, a shell to coact therewith, a plunger for impacting the shell and shifting the jaws to gripped position held by the shell, means coupling the shell and plunger for relative movement and supporting said jaws, latch mechanism for locking the shell and plunger against relative movement and operable by an object entering between the jaws for releasing the shell and plunger for relative movement, and means operable to form a direct connection between the shell and plunger whereby the shell may be retracted to free the jaws.

In testimony whereof I affix my signature.

WILLIAM H. PUCKETT. [L. S.]